United States Patent
Piegay et al.

(10) Patent No.: US 9,332,052 B2
(45) Date of Patent: May 3, 2016

(54) REMOTELY SITED EXECUTION OF A SOFTWARE APPLICATION WITHIN A NETWORK

(75) Inventors: Romain Piegay, Paris (FR); Roberto Agro, Bourg La Reine (FR)

(73) Assignee: ORANGE, Paris (FR)

( * ) Notice: Subject to any disclaimer, the term of this patent is extended or adjusted under 35 U.S.C. 154(b) by 413 days.

(21) Appl. No.: 13/882,026

(22) PCT Filed: Oct. 26, 2011

(86) PCT No.: PCT/FR2011/052499
§ 371 (c)(1),
(2), (4) Date: Jul. 22, 2013

(87) PCT Pub. No.: WO2012/056170
PCT Pub. Date: May 3, 2012

(65) Prior Publication Data
US 2014/0149565 A1    May 29, 2014

(30) Foreign Application Priority Data

Oct. 27, 2010  (FR) ...................................... 10 58865

(51) Int. Cl.
*H04L 29/06*       (2006.01)
*H04N 21/24*       (2011.01)
(Continued)

(52) U.S. Cl.
CPC .............. *H04L 65/608* (2013.01); *G06F 3/002* (2013.01); *H04N 21/241* (2013.01);
(Continued)

(58) Field of Classification Search
CPC .. G06F 3/002; H04N 21/2405; H04N 21/241; H04N 21/25808; H04N 21/2662; H04N 21/43615; H04N 21/4424; H04L 65/608
See application file for complete search history.

(56) References Cited

U.S. PATENT DOCUMENTS

| | | | |
|---|---|---|---|
| 2003/0055327 A1* | 3/2003 | Shaw et al. ................... | 600/407 |
| 2006/0188096 A1  | 8/2006 | Aguilar | |
| 2009/0248702 A1* | 10/2009 | Schwartz et al. ............... | 707/10 |
| 2010/0287463 A1* | 11/2010 | Lee ............................... | 715/243 |
| 2014/0129684 A1* | 5/2014 | Walter et al. .................. | 709/219 |

FOREIGN PATENT DOCUMENTS

EP          18456831 A2      10/2007

OTHER PUBLICATIONS

Jongwoo Sung et al., "UPnP Based Intelligent Multimedia Service Architecture for Digital Home Network", Apr. 27, 2006, The Fourth IEEE Workshop (SEUS 2006/WCCIA 2006), p. 157-162.*

(Continued)

*Primary Examiner* — Brian J Gillis
*Assistant Examiner* — Gil H. Lee
(74) *Attorney, Agent, or Firm* — David D. Brush; Westman Champlin & Koehler, P.A.

(57) ABSTRACT

A method of controlling an execution of a software application. The method includes, within a control device designed for driving at least one multimedia contents restitution device: a step of obtaining, from an execution device configured to trigger an execution of the software application, first connection data to be used by a restitution device to establish a first communication link across a network with the execution device and receiving, during the execution, via the first communication link a multimedia stream resulting from the execution; a step of transmitting to the restitution device parameters for restitution of a multimedia content comprising the first connection data; and a step of dispatching to the restitution device a command for restitution of the multimedia content, intended for triggering a restitution by the restitution device of the multimedia stream.

11 Claims, 5 Drawing Sheets

(51) Int. Cl.
  H04N 21/241    (2011.01)
  H04N 21/258    (2011.01)
  H04N 21/2662   (2011.01)
  H04N 21/436    (2011.01)
  H04N 21/442    (2011.01)
  G06F 3/00      (2006.01)

(52) U.S. Cl.
  CPC .... *H04N 21/2405* (2013.01); *H04N 21/25808* (2013.01); *H04N 21/2662* (2013.01); *H04N 21/43615* (2013.01); *H04N 21/4424* (2013.01)

(56) References Cited

OTHER PUBLICATIONS

English Translation of the International Preliminary Report on Patentability and Written Opinion of the International Searching Authority dated Apr. 30, 2013 for corresponding International Patent Application No. PCT/FR2011/052499 filed Oct. 26, 2011.

International Search Report and Written Opinion dated Jan. 5, 2012 for corresponding International Patent Application No. PCT/FR2011/052499 filed Oct. 26, 2011.

French Search Report dated May 26, 2011 for corresponding French Patent Application No. 1058865 filed Oct. 27, 2010.

Jongwoo Sung et al.: "UPnP Based Intelligent Multimedia Service Architecture for Digital Home Network", Software Technologies for Future Embedded and Ubiquitous Systems, 2006 and the 2006 Second International Workshop on Collaborative Computing, Integration, and Assurance. SEUS 2006/WCCIA 2006. The Fourth IEEE Workshop on Gyeongju, Korea Apr. 27-28, 2006, pp. 157-162, XP010912478.

Hyunju Lee et al.: "The u-Muse system: An Integrated UPnP AV Home Entertainment System supporting RUI Service and Device Mobility", Hybrid Information Technology, 2006, !ICHIT '06, IEEE, Piscataway, NJ, USA, Nov. 9, 2006, pp. 712-717, XP031260295.

\* cited by examiner

REMOTELY SITED EXECUTION OF A SOFTWARE APPLICATION WITHIN A NETWORK

CROSS-REFERENCE TO RELATED APPLICATIONS

This Application is a Section 371 National Stage Application of International Application No. PCT/FR2011/052499, filed Oct. 26, 2011, which is incorporated by reference in its entirety and published as WO 2012/056170 on May 3, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The field of the invention is that of the management of interactive software applications.

More specifically, the invention applies to the distribution and execution of interactive software applications on different UPnP devices of an UPnP network.

The invention can implement especially the UPnP (Universal Plug and Play) protocol which simplifies the implementing of local area networks and enables peripherals to link up easily in order to share contents such as images, audio contents, video contents, etc.

BACKGROUND

The UPnP/DLNA standard is becoming prevalent as a standard for the sharing, distribution and control of digital multimedia contents.

More specifically, the UPnP standard is a protocol that enables several computers or other information processing devices, which are then called UPnP devices, to be connected in a simple way to one another. This standard is promulgated by the UPnP Forum (http://www.upnp.org/). The sending of UPnP commands enabling the UPnP devices to be made to communicate with one another (these commands are called UPnP actions) and enabling the exertion of control over certain UPnP devices of the network, is based especially on the TCP/IP, UDP and HTTP protocols. SSDP (Simple Service Discovery Protocol) messages make it possible to discover the devices and services available on a network. They work whatever the operating system of the UPnP device.

Thus, the UPnP standard enables an easy sharing of the digital contents, such as photographs, films or music within a network.

However, the inventors have noted that there are no simple and comparable mechanisms enabling the execution of the software applications by means of different UPnP devices of an UPnP network. Indeed, to enable the execution of the software applications, it is necessary firstly to set up heavy infrastructures outside the UPnP network, and secondly to have available a substantial bandwidth in order to maintain optimal reactivity and prevent any latency that would rule it out for the users.

SUMMARY OF THE INVENTION

The invention improves the situation.

According to a first aspect, the invention pertains to a method for controlling an execution of a software application, characterized in that it comprises, within a control device designed for driving at least one multimedia contents rendering device:
  a step for obtaining, from an execution device configured to activate an execution of said software application, first connection data to be used by a rendering device to set up a first communications link through a network with the execution device and to receive, during this execution, through said first communications link, a multimedia stream resulting from said execution,
  a step for transmitting, to said rendering device, parameters for rendering a multimedia content comprising said first connection data,
  a step for sending said rendering device a command for rendering said multimedia content, intended for activating a rendering by said rendering device of said multimedia stream.

Correlatively, the invention pertains to a control device designed for driving at least one device for rendering multimedia contents and comprising:
  means for obtaining, from an execution device configured to activate an execution of a software application, first connection data to be used by a rendering device to set up a first communications link through a network with the execution device and to receive, during said execution, through said first communications link, a multimedia stream resulting from said execution communication,
  means for transmitting, to said rendering device, parameters for rendering a multimedia content comprising said first connection data,
  means for sending, to said rendering device, a command for rendering said multimedia content intended for activating a rendering, by said rendering device, of said multimedia stream.

According to the invention, the control device plays the role of an intermediary between the execution device, used to execute the software application, and the rendering device serving to render a multimedia stream resulting from the execution of this software application. The control device obtains especially the connection data needed to set up a communications link through a network between the execution device and the rendering device.

This setting up of communication enables the implementing of a remote execution service for executing software applications using existing entities namely, the multimedia content rendering devices and the control devices designed to drive such rendering devices. The term used is remote execution in that the communications link is set up through a network.

This setting up of communication enables the transmission of the stream to be rendered, in this case a multimedia stream resulting from the execution of the software application. The reception and rendering of the multimedia stream take place during this execution.

The control device and the rendering device are for example implemented in the form of UPnP devices: thus, the functions of these UPnP devices are broadened to provide a software application execution service. Furthermore, the invention preserves the mechanisms laid down in the UPnP standard for interfacing between the control device and a rendering device: a sending of rendering parameters followed by a sending of a rendering command. The invention can therefore easily be integrated into existing UPnP devices.

According to one embodiment, the control method further comprises a step for obtaining, from a contents server, indexing data of said multimedia content comprising a first content location address to be used by the execution device to obtain a software module designed for an execution of said software application, the first connection data being in the form of a second content location address.

The execution device is indeed designed firstly to obtain the software module designated by the first location address and activate the execution of the software application by means of this software module and, secondly, generate the multimedia stream resulting from this execution in order to make this multimedia stream accessible from the second location address.

Through the use of a location address, designating and localizing the software application to be executed, the execution device becomes parameterizable: it is capable of executing different software applications.

Through the use of a location address from which the multimedia stream can be obtained, it is possible to manage several connections: the execution device can be used to simultaneously transmit several multimedia streams coming from the simultaneous execution of several applications.

The rendering, during said execution, of a multimedia stream resulting from the execution of a software application makes it necessary to manage (identify, localize, process) two types of contents: firstly a content in the form of a software module designed for an execution of said software application and secondly a content constituted by the multimedia stream resulting from this execution. This management is done by the execution device which receives a piece of information on the first type of content and in exchange provides a piece of information on the second type of content.

There is thus a re-direction between the content server and the rendering server: the rendering is done not by means of a link set up towards a local content server or remote content server, as is the case in the UPnP standard, but towards a software application execution device which generates the streams to be rendered.

According to one particular embodiment, the control method further comprises a step for transmitting, to said execution device, an instruction for initializing said software application comprising the first content location address.

The execution device can be driven and parameterized: it is the control device which, by means of this location address, designates and locates the software application to be executed. Furthermore, the choice of software application to be executed can be done by a user of the control device.

According to one embodiment, the control method further comprises, within said control device:
a step for receiving, from said execution device, second connection data to be used by a rendering device to set up a second communications link through a network with the execution device and to transmit, through said second communications link, at least one command to be executed by said software application and representing at least one action performed by a user by means of a peripheral of the rendering device;
a step for modifying indexing data of said software application by integrating therein said second connection data;
a step for transmitting modified indexing data to a rendering device.

The rendering device, serving to render the multimedia stream, achieves remote control of the execution of the application through the sending of these commands. In particular, a user of this rendering device can view/listen to the video/audio content of this stream on the rendering device and at the same time send out commands to the software application. Thus, a remote execution mechanism is obtained, compatible with the mechanisms for managing and rendering contents defined in the UPnP standard.

According to one embodiment, the control method further comprises a step for selecting, from a plurality of execution devices, an execution device capable of executing said software application as a function of a configuration needed for executing said software application.

This ensures that the execution device will be capable of executing a given software application.

According to one embodiment of the control method, when the control device is implemented in the form of a UPnP device and when the execution device is implemented within a UPnP device in the form of an applications execution service, the control method comprises a step for implementing a protocol of discovery of said UPnP device and said applications execution service.

An implementation in the form of a UPnP service enables the UPnP devices of the network to detect the presence of the service and to interface with the execution device by means of the mechanisms stipulated in the UPnP standard. The linking up is greatly facilitated and standardized: it becomes capable of being used by any UPnP rendering device and any UPnP control device having the functional upgrades needed for managing contents in the form of software applications.

Finally, the integration, into an UPnP control device, of functions for presenting contents in application form simplifies matters for the user who uses one and the same software program to manage his audio and/or video contents, text and software applications.

According to a second aspect, the invention pertains to a method for executing a software application characterized in that it comprises, within an execution device:
a step for activating an execution of said software application,
a step for transmitting, to a control device designed for driving at least one multimedia contents rendering device, first connection data to be used by a rendering device to set up a first communications link through a network with the execution device and to receive, during said execution, a multimedia stream to be rendered, resulting from said execution,
a step for setting up said first communications link with said rendering device,
a step for transmitting said multimedia stream to said rendering device via said first communications link.

According to one embodiment, the method of execution furthermore comprises:
a step for transmitting, to said control device, second connection data that can be used to set up a second communications link through a network with the execution device,
a step for setting up said second communications link with said rendering device,
a step for receiving, through said second link, at least one command to be executed by said software application and representing at least one action performed by a user by means of a peripheral of the rendering device,
a step for transmitting said command to said software application being executed.

According to one embodiment of the control method, when the control device is implemented in the form of a UPnP device and when the execution device is implemented within a UPnP device in the form of an applications execution service, the execution method furthermore comprises a step for implementing a protocol of discovery of said UPnP device and said applications execution service.

According to one embodiment, the method of execution furthermore comprises, prior to said activating step, a step for creating an applications session during which said activation step shall be executed, said first connection data comprising an identifier of said applications session and an address of said execution device.

Correlatively, the invention pertains to a device for executing a software application characterized in that it comprises:
- means for activating an execution of said software application,
- means for transmitting, to a control device designed for driving at least one multimedia content rendering device, first connection data to be used by a rendering device to set up a first communications link through a network with the execution device and to receive, during said execution, a multimedia stream to be rendered, resulting from said execution,
- means for setting up said first communications link with said rendering device,
- means for transmitting said multimedia stream to said rendering device via said communications link.

The advantages set forth for the control device and for the control method respectively can be transposed directly to the execution device and to the execution method respectively, that have just been presented.

According to a third aspect, the invention pertains to a device for rendering multimedia contents, capable of communicating with an execution device configured to activate an execution of a software application, the rendering device comprising:
- means for obtaining parameters for rendering a multimedia content, said parameters for rendering comprising first connection data to be used to set up a first communications link through a network with said execution device,
- means for setting up said first communications link with the execution device and means for receiving a multimedia stream resulting from said execution via said first communications link,
- means for receiving a command for rendering said multimedia content, activating a rendering by said rendering device of said multimedia stream.

According to one embodiment, the rendering device comprises:
- means for obtaining indexing data of said multimedia content, said indexing data comprising second connection data to be used to set up a second communications link through a network with said execution device,
- means for setting up said second communications link with the execution device,
- means for transmitting, through said second communications link, at least one command to be executed by said software application and representing at least one action performed by a user by means of a peripheral of the rendering device.

The advantages set forth for the control device and for the control method respectively can be directly transposed respectively to a rendering device and to the rendering method that has just been presented.

The invention also pertains to a computer program comprising instructions for implementing a control method or an execution method as presented here above when this program is executed by a processor.

The invention also pertains to an information carrier readable by a data processor and comprising instructions of a computer program as mentioned here above.

LIST OF FIGURES

Other features and characteristics of the invention shall appear more clearly from the following description of a particular embodiment given by way of a simple illustratory and non-exhaustive example and from the appended figures, of which:

Figure 2:
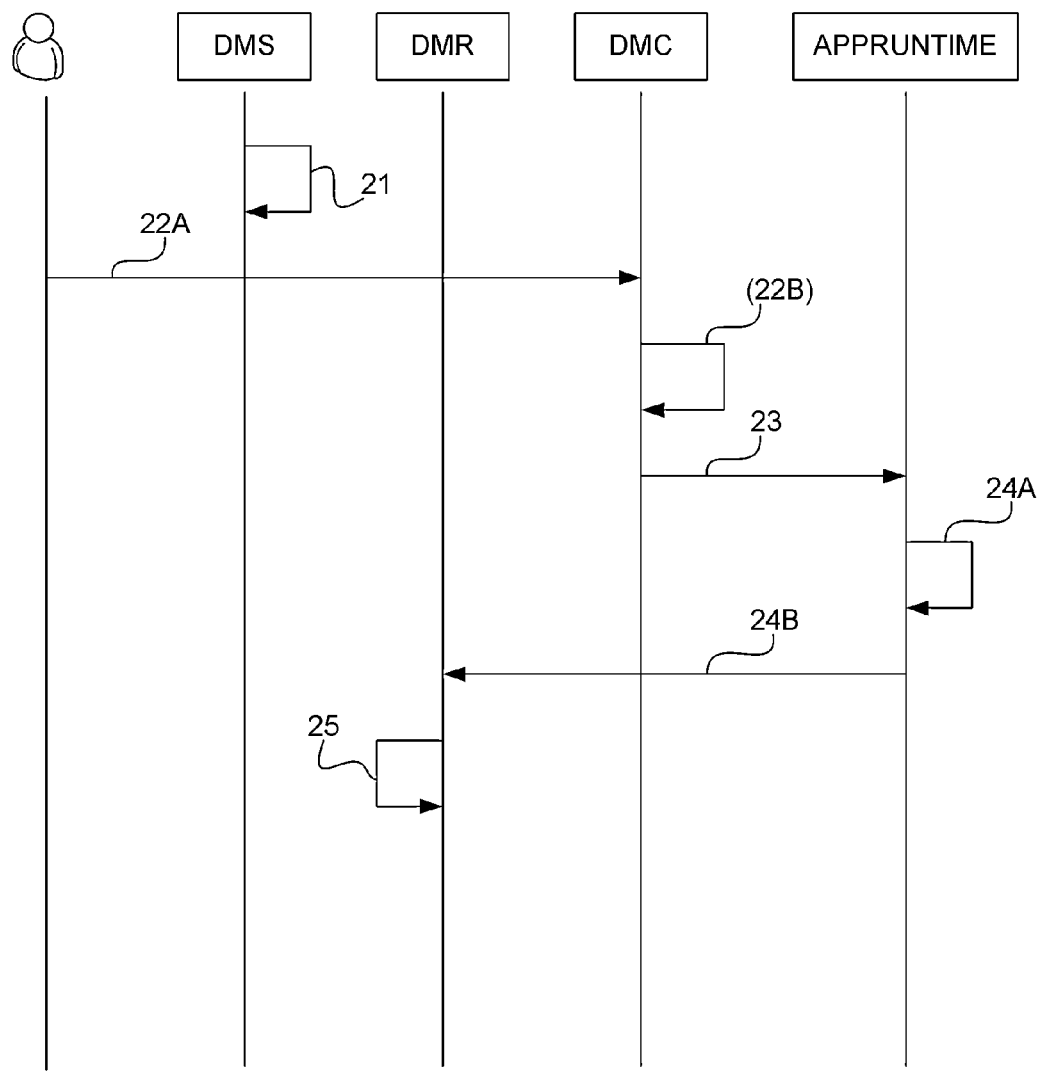
Figure 2B:
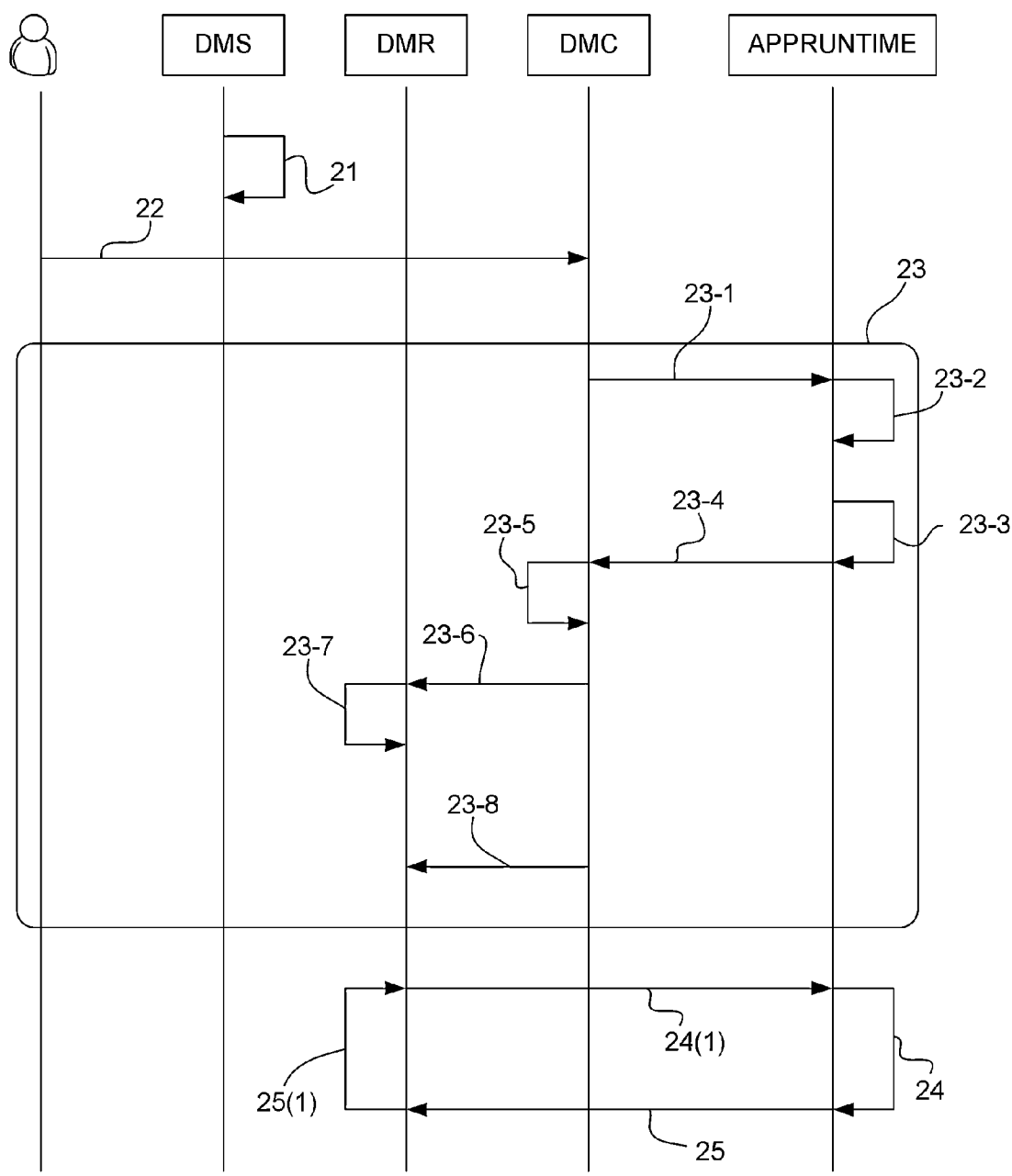
Figure 3:
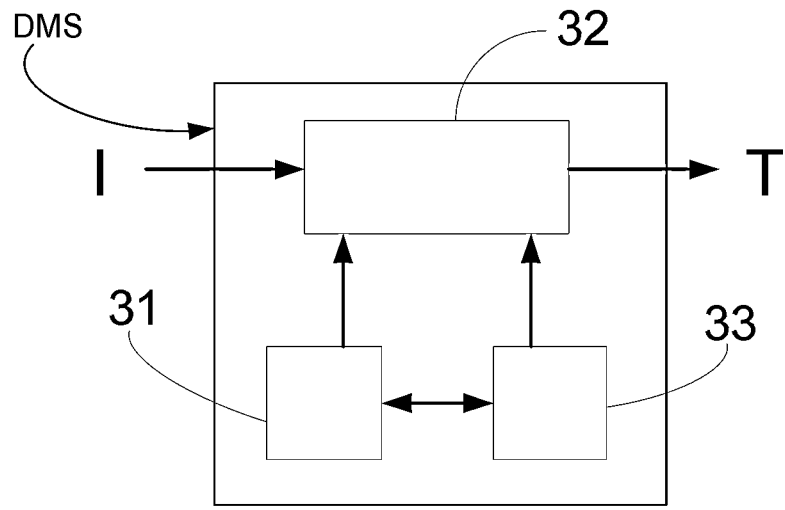
Figure 4:
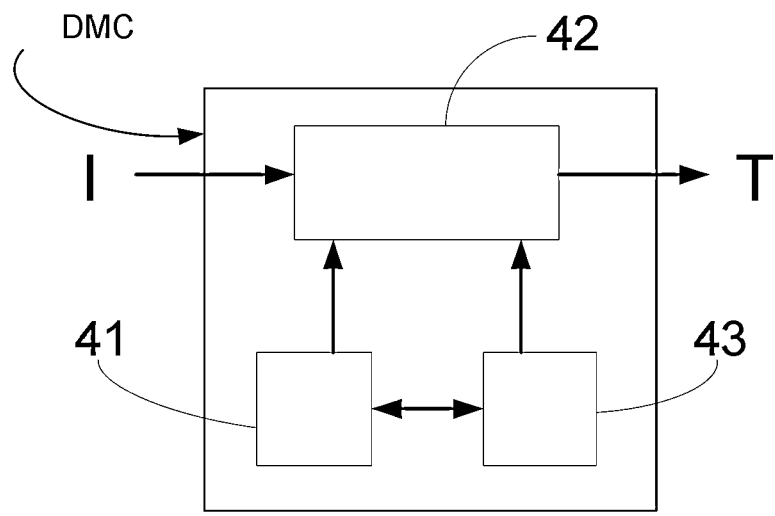
Figure 5:
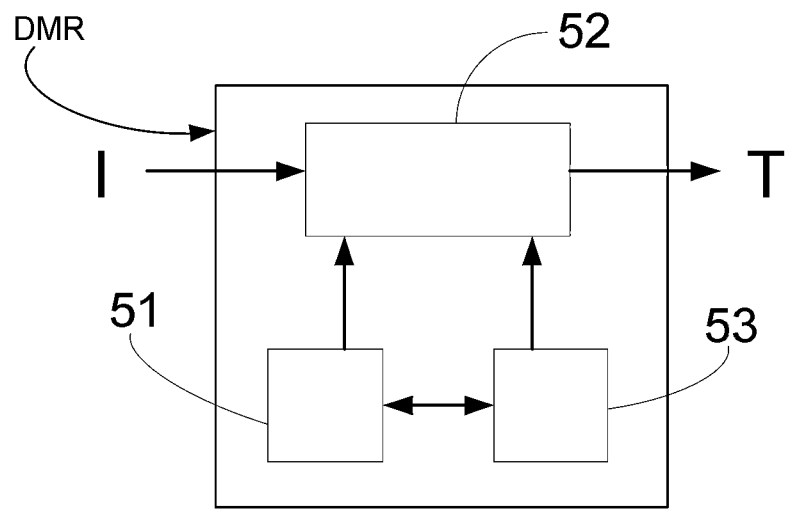
Figure 6:
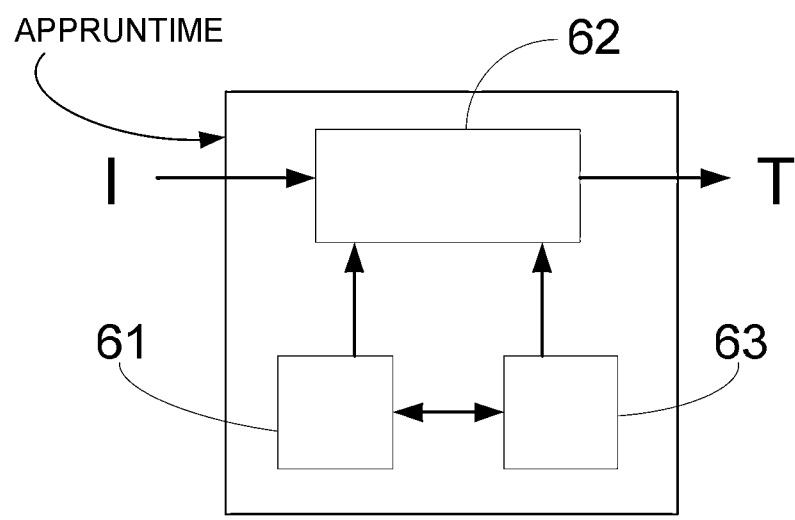

FIG. 2 presents the main phases of the method for executing a software application according to one embodiment;

FIG. 2B gives a detailed view of the steps of the method for executing a software application according to one embodiment;

FIG. 3 illustrates an example of a simplified structure of a multimedia contents server;

FIG. 4 illustrates an example of a simplified structure of a control device for executing a software application;

FIG. 5 illustrates an example of a simplified structure of a device for rendering an audio/video stream resulting from the execution of a software application;

FIG. 6 illustrates an example of a simplified structure of a device for executing a software application.

DESCRIPTION OF ONE EMBODIMENT

1. General Principle

The selection of an execution device that executes a software application, itself selected by a user, is done according to a configuration needed for executing this software application and makes it possible to take account of the capacities of execution of the execution device.

The software application is executed by the execution device while the multimedia stream resulting from this execution is rendered on a rendering device connected through a network to the execution device. These two devices (namely execution/rendering devices) are laid out, according to the invention, so as to enable the setting up of a first communications link for sending the rendering device a multimedia stream to be rendered and a second communications link for sending commands to be executed by the software application.

The invention is capable of being implemented by means of UPnP devices, especially:
- a Digital Media Server (DMS) which carries out an indexing, as multimedia contents, of software application type contents,
- a control point or Digital Media Controller (DMC) which coordinates the execution of the software application and the rendering of the multimedia stream resulting from this execution,
- the Digital Media Renderer (DMR) which renders this multimedia stream.

In the context of the invention, an additional device comes into play: this is a device for remote execution of the software application selected by the user (APPRUNTIME). This execution device is for example implemented in a UPnP device forming part of the network.

Here below, we recall the architecture and principle of operation of the UPnP entities defined in the UPnP/DLNA standard. Then, a detailed description is given of the developments of this architecture as proposed in the context of the invention and an explanation is provided of the general method of execution of software applications as proposed in the invention.

1.1 the UPnP Standard and the UPnP A/V Architecture

Figure 1:
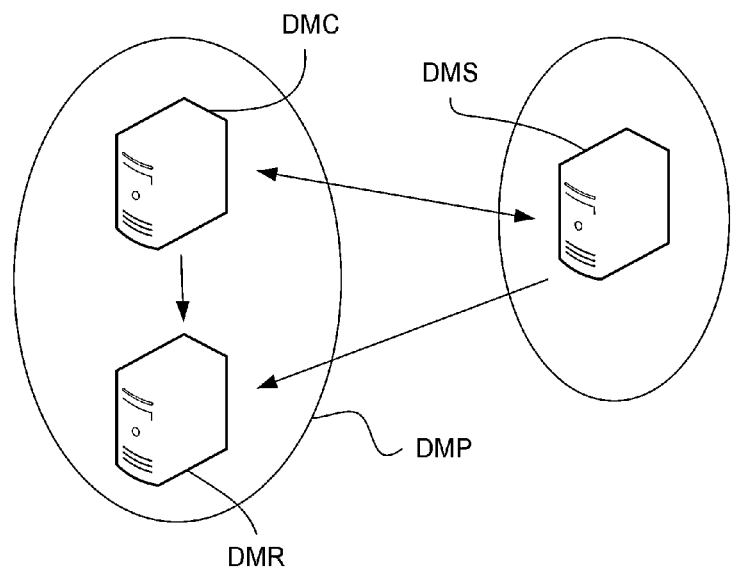
FIG. 1 illustrates an example of a representation of the UPnP AV architecture.

The UPnP AV/DLNA (UPnP Audio and Video) architecture shown with reference to FIG. 1 brings three types of entities into play in a network for the management of the video, audio and photographic contents:

- the Digital Media Server (DMS or "digital media server"): this is a UPnP device which shares its multimedia contents (such as audio, video or images) with the other UPnP devices of the network;
- the control device, also called a UPnP control point (CP) or DMC ("digital media controller"): an entity which can detect the UPnP devices and their services, receive events from these devices and control them by sending them UPnP commands (called actions);
- the Digital Media Renderer or DMR ("digital media renderer"): a "slave" device in charge of rendering a content to a peripheral of the apparatus that integrates this rendering device 422 (for example a television set, a HiFi system, etc.)

The functional assembly constituted by the DMC "control point" and the rendering device or DMR is called a UPnP DMP (digital media player) and constitutes a second type of rendering device. Among the most widespread UPnP DMP digital media players, we can especially cite games consoles such as the PS3™ or the XBOX 360™ and television sets, which can be connected to a network, for example a home network of their owner.

Each of these devices implements services specified by the UPnP. In particular, a UPnP rendering device implements a connection management service (called a "ConnectionManager" in the UPnP standard), a rendering control service (called RenderingControl in the UPnP standard), a rendering service (called "AVTransport" in the UPnP standard).

According to the UPnP standard, the scenario for rendering a classic multimedia content (image, textures, models, 3D, text, music, etc.) is the following:

- the UPnP control point obtains the location address of a multimedia content to be rendered by interrogating the UPnP multimedia contents server, provided with a multimedia content indexing database in the form of a directory of multimedia contents ("Content Directory Service" in the UPnP standard);
- the UPnP control point transmits, to the selected UPnP rendering device, parameters for rendering a multimedia content, comprising a location address of the multimedia content, by using the "SetAVTransportURI" action of the "AVTransport" service of the UPNP rendering device;
- the UPnP control point activates the rendering of the multimedia content by invoking the rendering action "PLAY" of the "AVTransport" service of the UPnP rendering device;
- the rendering device obtains the multimedia content proper by sending an HTTP "GET" request to the entity designated in the location address of the multimedia content sent by means of the "SetAVTransportURI" action (for example a media server).

In the UPnP standard, when the rendering device 422 chosen is of the DMR type, we refer to a three-box model because three distinct UPnP devices have to act to implement the rendering of multimedia content (DMS+DMC+DMR). When the rendering device 422 chosen is of the DMP type, we refer to a two-box model because two distinct UPnP devices have to act to implement the rendering of a multimedia content (DMS and DMP), the DMP combining, in this two-box model, the functions of the DMC and of the DMR.

1.2 System Implemented in the Context of the Invention

Figure 1B:
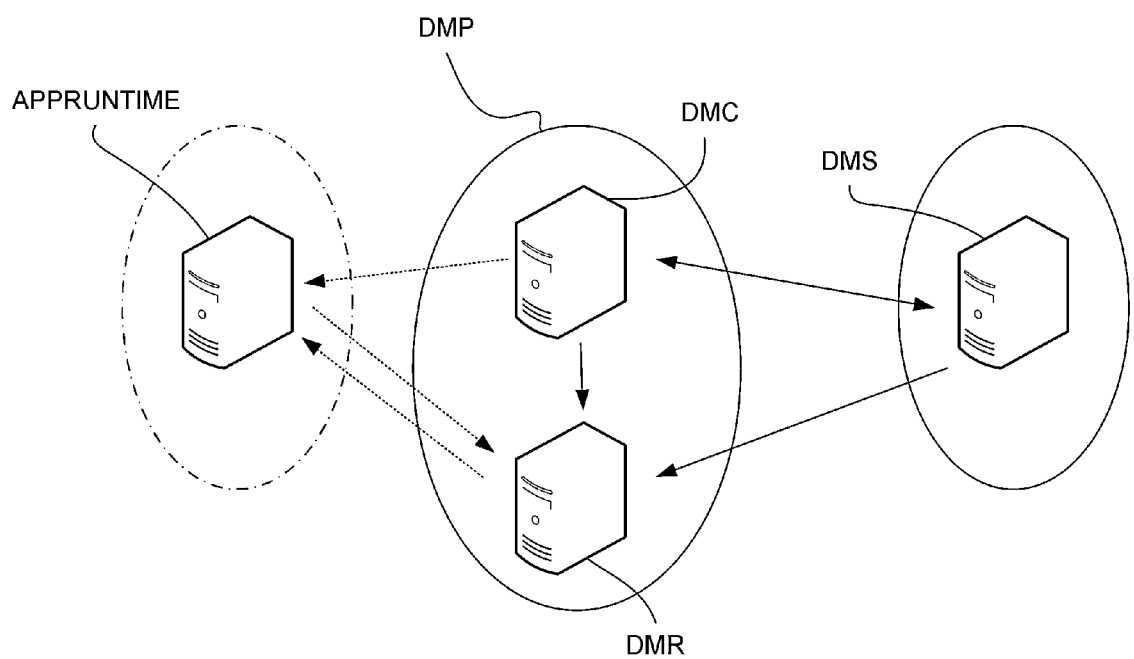
FIG. 1B illustrates an example of a representation of the UPnP AV architecture adapted to the remote execution of software applications.

As referred to here above, and with reference to FIG. 1B, the system of the invention comprises in this embodiment the following main elements:

- a contents server in the form of a UPnP DMS (Digital Media Server) content server capable of indexing the software applications and presenting them as enhanced multimedia contents having specific properties distinct from those of the multimedia contents traditionally indexed by such a contents server;
- a multimedia content rendering device in the form of a UPnP DMR (Digital Media Renderer) rendering device enhanced so as to be capable of transmitting user commands ("user input") (keys, buttons, joystick, mouse, etc.) to a software application execution device ("APPRUNTIME");
- a control device, in the form of a UPnP DMC (Digital Media Controller or Control Point) control point designed to drive a multimedia content rendering device and furthermore capable of exploiting the properties specific to the software application type contents;
- a software application execution device ("APPRUNTIME") capable of being implemented for example in the form of a UPnP service and in charge of executing the software application, transmitting a video stream to a DMR rendering device and receiving notifications on actions performed by the user ("user inputs") on a user interface of the DMR rendering device to transmit these notifications to the software application being executed. This device then constitutes, according to the invention, an UPnP entity in addition to the UPnP system preliminarily presented with reference to FIG. 1.

1.3 Execution of Software Application According to the Invention

The invention proposes a new development of the UPnP protocol in order to execute the software application by means of an execution device having resources adapted to the selected software application, and in order to render a multimedia stream resulting from this execution on a UPnP rendering device chosen by the user. In other words, the invention enables the execution of a software application on a remote APPRUNTIME execution device while the rendering of a stream resulting from the execution is done by the UPnP rendering device.

Thus, the method of execution makes it possible to limit access to the Internet from the UPnP network and does not require the implementation of a complex architecture outside the user's UPnP network. Another advantage is that the rendering of a software application can be done on a low-powered terminal (such as a tablet, Netbook, etc.) by using the resources of a powerful apparatus (personal computer, games console, etc.)

Referring to FIG. 3, we present the main general steps of the execution method 20. More particularly, the method for executing a software application comprises:

- a step for indexing 21, as multimedia contents, software applications in an content indexing database of a multimedia contents server DMS; this step 21 is independent of the steps of the method for executing an application and is described here below;
- a step of selection 22A, by a user, of a software application to be executed from among a plurality of software applications indexed in this indexing database;

a step 23 for initializing, within an APPRUNTIME execution device, an application session for the execution of the software applications selected at the step 22A; this initialization comprising a step of transmission, from the APPRUNTIME execution device to the control device, of data for connection to the execution device;

a step for deactivating, by means of the APPRUNTIME execution device, the execution 24A of the selected software application;

a step for transmitting 24B a multimedia stream, resulting from the execution of the selected software application, from the APPRUNTIME execution device to the DMR rendering device, through a communications link set up by using the connection data transmitted;

a step 25 for rendering the multimedia stream received by the DMR rendering device.

The method also comprises a step 22B for selecting an APPRUNTIME execution device from among a plurality of available execution devices. This selection is done as a function of the resources of the execution devices available within the network.

Thus, the invention offers novel possibilities for executing software applications within UPnP networks without requiring access to resources other than those of the UPnP network. In particular, it is not necessary to make use of structures known as "cloud computing" structures to implement the software applications selected by the user. This increases the user's independence on the one hand and benefits from the resources available within the user's personal network on the other hand. Indeed, it is not infrequent for a user to possess UPnP devices (computers, games consoles, etc.) which by their very nature have very large data-processing capacities. For most of the time, these capacities are only partially exploited and cannot be shared with the other devices of the network. The invention makes this sharing possible especially by means of the UPnP protocol which numerous devices are already capable of implementing.

A software application according to the invention may consist for example in executing a video publishing software application on a computer from a mobile terminal such as a portable telephone.

In other words, the invention makes it possible to:
control the execution of a software application by means of a UPnP type control device or control point;
activate the execution of the software application by means of the APPRUNTIME execution device of the network which takes account of the actions performed by the user on the DMR Digital Media Renderer, these actions being transmitted by the DMR Digital Media Renderer to the APPRUNTIME execution device;
view the results of the execution of the software application on the DMR Digital Media Renderer (for example a television set) by rendering a multimedia stream coming from the APPRUNTIME execution device and resulting from the execution of the software application under the effect of the actions performed by the user.

The multimedia stream coming from the APPRUNTIME execution device is obtained according to the invention by setting up a connection link between the APPRUNTIME execution device and the DMR rendering device by means of connection data provided by the execution device. This is the link through which the multimedia stream resulting from the execution of the software application will then be transmitted.

To obtain commands representing actions performed by the user by means of the peripheral of the DMR rendering device, peripheral drivers are used to transmit the events corresponding to the commands to the rendering application of the DMR Digital Media Renderer.

These commands are transmitted to the APPRUNTIME execution device which takes responsibility for transmitting them to the destination software application. It does so, for example, by reporting events corresponding to these commands to the process, initiated for execution of this software application, the execution device of which has obtained an identifier ("process handle") during the activation according to the software application.

The multimedia stream is generated on the fly during the execution of the software application by the execution device. To retrieve the audio and/or video data output from the application and generate a streaming audio and/or video stream, the multimedia buffer memories and the functions of the operating system of the APPRUNTIME execution device are used. For example, in WINDOWS™ operating system, the programming interface Win32 is used to access this memory. The execution device interface then takes charge of constituting a multimedia stream (audio and/or video) which it transmits to the rendering device in streaming mode.

The multimedia stream received by the DMR Digital Media Renderer is rendered as any other multimedia stream by using the usual display functions. It is transparent to the rendering device that the multimedia stream is generated on the fly during the execution of the software application by the rendering device from the data generated by this software application.

FIG. 3 illustrates an example of a simplified structure of a DMS Digital Media Server according to one embodiment of the invention. For example, the multimedia contents server comprises a memory 31 constituted by a buffer memory, a processing unit 32 equipped for example with a microprocessor and driven by the computer program 33, implementing a software application indexing management method.

At initialization, the code instructions of the computer program 33 are for example loaded into a memory and then executed by the processor of the processing unit 32. The processing unit 32 inputs at least one software application to be indexed. The microprocessor of the processing unit 32 implements the steps of the indexing management method, according to the instructions of the computer program 33, to index and distribute at least one software application to a device of the network to which the multimedia contents server is itself connected.

To this end, the multimedia contents server comprises, in addition to the buffer memory 31:
means for indexing, in an indexing database, at least one software application as a multimedia content by recording metadata of this software application and means for recording a location address of at least one software module designed to execute the software application,
means for transmitting metadata of the indexing database to a Digital Media Controller (DMC) designed to drive multimedia content rendering devices.

These means are driven by the microprocessor of the processing unit 32.

FIG. 4 illustrates a simplified structure of a DMC Digital Media Controller according to one embodiment of the invention.

For example, the multimedia contents server comprises a memory 41 constituted by a buffer memory, a processing unit 42 equipped for example with a microprocessor and driven by the computer program 43, implementing the method for controlling the execution of a software application according to the invention.

At initialization, the code instructions of the computer program 43 are for example loaded into a memory and then executed by the processor of the processing unit 42. The processing unit 42 inputs software applications indexing data. The microprocessor of the processing unit 42 implements the steps of a method for controlling a software application, according to the instructions of the computer program 43, to select at least one preliminarily indexed software application.

To this end, the multimedia contents server comprises, in addition to the buffer memory 41:

- means for obtaining metadata ($M_{AS}$) from the indexing database,
- means for selecting a multimedia content from said metadata obtained, the selected multimedia content being a software application indexed as a multimedia content by the multimedia content server,
- means for selecting a device for rendering multimedia content (DMR) capable of rendering the multimedia stream resulting from the execution of the software application,
- means for selecting an (APPRUNTIME) execution device capable of executing the software application,
- means for transmitting, to the selected APPRUNTIME rendering device, metadata ($M_{AS}$) of the selected multimedia content.

These means are driven by the microprocessor of the processing unit 42.

FIG. 5 is a simplified view of an example of a structure of a DMR or multimedia content rendering device according to one embodiment of the invention.

For example, the DMR rendering device comprises a memory 51 constituted by a buffer memory, a processing unit 52, equipped for example with a microprocessor and driven by the computer program 53, implementing a method for rendering a software application according to the invention.

At initialization, the code instructions of the computer program 53 are for example loaded into a memory and then executed by the processor of the processing unit 52. The processing unit 52 inputs a first set (URL_STREAMING) of connection data for connection to the execution device to set up a communications link with the execution device, through which a multimedia stream to be rendered by the rendering device will be transmitted by the execution device.

These pieces of connection data are encoded and transmitted in the form of a URL type address, designed to be used, during transmission by the DMR Digital Media Renderer of an HTTP request for obtaining data of the content to be rendered instead of the URI_ORIGINAL address. This URL type address is provided by the DMS contents server with which the software application is indexed and locates the data file containing the software module designed to execute this software application. In this way, the request for obtaining data of the content is sent not towards the contents server as is the case in the UPnP standard for an audio and/or video content but to the APPRUNTIME execution device.

The processing device 52 furthermore receives a second set (URL_USER_INPUT) of connection data for connection to the execution device to set up a communications link with the execution device, this being the link through which the commands to be executed by a software application will be transmitted to the execution device by the rendering device.

The microprocessor of the processing unit 52 implements the steps of the method for rendering a multimedia stream resulting from the execution of a software application by the execution device (APPRUNTIME) according to the instructions of the computer program 53.

To this end, the rendering device comprises, in addition to the buffer memory 51, means for receiving a multimedia stream coming from the execution device and means for transmitting, to the execution device, commands representing actions performed by a user by means of peripherals of the DMR rendering device. These means are driven by the microprocessor of the processing unit 52.

FIG. 6 illustrates an example of a simplified structure of a device for executing an APPRUNTIME software application according to one embodiment of the invention.

For example, the execution device comprises a memory 61 constituted by a buffer memory, a processing unit 62, equipped for example with a microprocessor and driven by the computer program 63, implementing a method for rendering a software application according to the invention.

At initialization, the code instructions of the computer program 63 are for example loaded into a memory and then executed by the processor of the processing unit 62. The processing unit 62 inputs an instruction for executing a software application. The microprocessor of the processing unit 62 implements the steps of the method for implementing a software application, according to the instructions of the computer program 63.

To this end, the device for executing a software application comprises, in addition to the buffer memory 61, means for receiving commands representing actions performed by a user by means of peripherals of the DMR Digital Media Renderer and means for transmitting a multimedia stream resulting from the execution of the software application. These means are driven by the microprocessor of the processing unit 62.

In short, the APPRUNTIME execution device, which can take the form of a specific hardware or software component, is a module (for example an UPnP service or an UPnP device) which sets up a link between the UPnP world and the software application. It is used to:

- initialize an application session on an apparatus (computer, games console, etc.) on which the software application has to be executed;
- provide, to the DMC Digital Media Controller, the data for connection (IP address, port, session identifier, etc.) with the execution device and for this application session, to be used for setting up the multimedia stream resulting from the execution of the software application and the stream of commands to be executed by the software application, these pieces of connection data being provided for example in the form of URLs usable by the DMR Digital Media Renderer;
- activate the execution of the software application and, during this execution:
  - constitute a multimedia streaming from the data (audio and/or video) resulting from the execution of the software application and transmit this stream to the DMR Digital Media Renderer;
  - transmit the commands representing actions performed by the user, received from the DMR Digital Media Renderer, to the software application.

The control device can thus be used to execute any software application whatsoever designated by a location address given by the control device, provided that there is available an execution environment compatible with the one required to execute a software application. Indeed, the execution of the software application is taken charge of by the operating system of the equipment on which the execution device is implemented. The execution device can nevertheless, during the execution of the software application, access data generated by this software application and send commands to this application by means of functions of the operating system which enable this type of interaction with a program being executed.

Here below, we present an embodiment in which the software applications are video games. It is clear that this embodiment in no way restricts the scope of the claims and that the invention can also be implemented for any type of software application such as for example interactive books, in which the engine enables the launching of the rendering of a content independent of the engine.

2. Description of an Embodiment of the Method for Executing a Software Application Here below, we describe an embodiment of the execution of a software application of the video games type within a UPnP network. An explanation of what a video game is and the technical modifications made to each UPnP device are presented.

2.1 Definition of a Video Game

Traditionally, a video game can be separated into two elements: firstly, a set of multimedia contents (images, textures, 3D models, text, music, etc.) and secondly, at least one software module (scripts, executable and/or interpretable program codes, etc.) capable of orchestrating the rendering of these multimedia contents on a screen so that the player can live his game experience. These two elements can be encoded either in distinct data files or in one and the same data file (this is the case of .WAD files integrating both the logic of a game (script) and the images/sounds to be rendered as and when the game unfolds).

In certain cases, the software module can take the form of an independent program (for example an executable ".exe" program) or a program requiring an execution engine (for example a ".jar" binary file).

A software module requiring an execution engine is for example a script requiring a script interpreter (playing the role of an execution engine) capable of interpreting this script, or a software component encoded in an exploitable language by an execution engine taking the form of a virtual machine.

Certain video game developers choose to develop a video game software module that is sufficiently generic, not specific to a precise video game but common to a series of games of the same type, capable of orchestrating the different software programs if the "multimedia content" part is modified.

Sometimes again, the video game software module is an independent program (a "game player"), i.e. a program in the form of an executable code (encoded in an ".exe" extension file in the case of the WINDOWS™ operating system) and the video game multimedia contents are stored in a format proper to the video game software module.

Certain games are executed by means of an execution engine taking the form of a virtual machine. A virtual machine implements the intermediate code of a software module which has been compiled in a standardized way to be executed on any platform whatsoever having an adequate virtual machine available to it. Thus, a software application that gets executed on a virtual machine is formed by one or more software modules which can be downloaded independently of the virtual machine in question. Among the games implemented on a software machine, we can cite the games or software applications in Flash language (.SWF files), games or software applications in Java (.JAR files), Silverlight, the Lucas Art adventure game ("ScummVM"), etc.

2.2 Indexing and Sharing of Game Type Contents

As explained here above, the game type content is by nature a set of data such as images, textures, 3D models, text, music, sound extracts, scripts for the "intelligent" actors of the game, etc.

Depending on the game engine, this data may be:
grouped together within one and the same file (example: .WAD file of the DOOM™ game engine);
referenced in an XML type file which indicates the location of all the data files;
or else again stored in a precise tree structure expected by the engine.

In the first and second cases here above, the address (URL) of the resource of the UPnP element refers to a file name. In the third case, it references the directory containing the data.

In order that a game type content may be indexed and shared by a multimedia contents server DMS it should be capable of obtaining the content metadata and recording it in a content indexing database named CDS (Content Directory Service) in the UPnP standard.

According to the UPnP standard, for each multimedia content constituting an object, one or more data fields are used to store the properties of this object: these data fields constitute the metadata of this object.

One of the properties of an object is its class of membership. Each object is indeed allocated to an object class, the name of this object class being stored in a data field named the "upnp: class".

The object classes are organized hierarchically and like a tree, certain classes being derived from other classes, depending on what is usual in object-oriented design. The root of this tree structure is the basic class called the "object" class. From this basic "object" class, two main classes are derived: firstly, the "object:item" class, defining a multimedia element or content (piece of music and/or video sequence and/or image and/or text, etc.), secondly the "object.container" class, defining a container object or a set of several multimedia contents.

From the "object.container" class, there is derived for example the "object.container.musicAlbum" class defining a music album comprising several pieces of music.

From the "object.item" class, there are derived for example the "object.item.textItem" classes defining a text, and "object.item.audioItem" content, defining an audio content.

With each multimedia content (i.e. with each object belonging to the "object.item" class), one or more resources are associated, each defining a data file of multimedia content.

Given that there are various technologies for games engines and different games formats, each game in this embodiment is accompanied by a set of metadata describing a software application and identifying the elements that compose it.

The metadata specific to a game type content are the following:
Genre: [string of characters] (e.g.: action, adventure, shoot'em up): type of game;
Rating: [number] (e.g.: 18 and over): minimum legal age of use;
Difficulty: [string of characters] (e.g.: easy, medium, hard): overall difficulty of the game;
Lifespan: [number] (e.g.: five hours): lifespan of the game, i.e. the total game time planned for an average player;
Required peripherals: [list of string of characters] (e.g.: keyboard, joystick): peripherals needed to execute this game;
Optional peripherals: [list of string of characters] (e.g.: wheel): peripherals that might be used with the game for improved experience;
List of compatible game engines—five parameters per "Game Engine":
1) Environment [string of characters] (e.g.: WINDOWS™, LINUX™, PLAYSTATION3™, XBOX 360™ etc.): Environment of execution of the game;

2) Version of environment: [string of characters]: software version of execution environment;
3) Name: [string of characters] (e.g.: Flash, Java, DOOM™, ScummVM or Native for binary software applications encoded in native form for the target environment): Name of main software module or Native;
4) Version: [string of characters];
5) Game Engine Provider URL [string of characters]: Address towards the game engine provider having this game engine available especially in the right version and for the right environment.

This description file can be defined in an XML form.

Thus, the multimedia contents server DMS analyses these description files and fills its database (its CDS).

In order to enable the differentiated processing of the contents which are software applications, the metadata of the content of this kind includes an indication according to which this content is a software application.

Two alternative embodiments are possible at this place.

In a first variant, a novel class of object adapted and proper to the software applications is defined. This class is called the "software applications" class. This "software applications" class is derived from the "object.container" class (in this case an application is seen as a set of multimedia contents) or derived from the "object.item" class (in this case an object is seen as a set of multimedia contents) for example:
object.container.applicationContainer or
object.item.applicationItem.

In a second variant, the game type contents are then exposed by the DMS contents server as video contents (object class: "object.item.videoItem") described by specific properties.

In addition to "standard" directories for music, photos or video, the DMS creates a tree structure for the games or it inserts the games into the tree structure of the videos. In this case, the class of membership of a content does not make it possible to determine whether or not this content is a software application. For this purpose, it is necessary to use the metadata having properties that are proper to the software applications, for example the "Required Peripherals", "Environment", "Environment Version", "Game Engine Provider", "Difficulty", and other properties.

An example of metadata is presented as an appendix to point 2.

In at least one embodiment, the invention thus comprises a step for indexing the software application, in this case the video game, by recording the metadata (step 21, FIG. 2) proper to the video game type contents, as presented in an appendix to the point 2. This indexing assumes a process of determining that the content to be indexed is a video game type content, determining whether an execution engine is necessary for executing the video game (it may be a virtual machine or a particular computer program) and, if the machine is not already present on the execution device, determining a location address within the communications network of this execution engine (the communications network may be the user's UPnP network or the Internet for example) and recording, within a database, a location address of a software module designed to execute the software application and a location address of said execution engine.

In other words, at the end of this indexing phase, the DMS Digital Media Server has available the necessary data to enable the implementing of the method of execution as described here above, namely:

the location address of a software module;
the identification of the engine needed to execute the video game; and
the location address of said execution engine making it possible to obtain and install this execution engine if it is not installed.

As described in detail here below, these pieces of indexing data are transmitted upon a UPnP request to the DMC control device in order to enable a user to select the video game to be executed. The DMC control device also enables the selection of a rendering device and the selection of an execution device which will execute this game. The DMC Digital Media Controller finally makes it possible to activate the execution of the game in sending a rendering command to the rendering device selected so that it can get connected to the execution device.

A multimedia stream, in streaming form (i.e. a continuously distributed stream), is then transmitted to the rendering device to be rendered by this device. The audio and video data resulting from the execution of the application are preferably multiplexed to generate a single streaming.

2.3 Verification of Compliance of the DMR Rendering Device and Selection of the "APPRUNTIME" Execution Device Compatible for the Remote Execution In UPnP AV, generally, the DMC control device verifies the compatibility of the DMR rendering device with the content selected by the user.

In this embodiment of the invention applied to the video game, the DMC Digital Media Controller performs specific checks. On the one hand, the DMC Digital Media Controller checks the compliance of the DMR Digital Media Renderer selected by the user. This check is done by means of specific indexing metadata provided by the multimedia contents server. On the other hand, the DMC Digital Media Controller identifies and selects a compatible "APPRUNTIME" execution device for remote execution according to the method of the invention.

To verify the compliance of the DMR Digital Media Renderer selected by the user, the DMC control device scans all the resources associated with the game and compares them with the formats/protocols supported by the DMR Digital Media Renderer obtained by the GetProtocolInfo( ) action of the ConnectionManager service of the DMR Digital Media Renderer.

The software application type contents are identifiable by the DMC control device by means of the metadata described here above. For these contents, the DMC Digital Media Controller must perform a check aimed at ensuring the DMR Digital Media Controller has the required peripherals available (keyboard, mouse, joystick) for the execution of the game and that it is provided with means to transmit the user actions to a third-party module.

It is therefore necessary in this embodiment to add a UPnP action so that the DMR Digital Media Renderer gives this information and so that the DMC Digital Media Controller can carry out these checks by means of the game metadata available by means of the Digital Media Server DMS. The information on the peripherals (keyboard, mouse, joystick, etc.) supported by the DMR Digital Media Renderer can be returned in response to an action named for example "GetPeripherals" which is added to the "ConnectionManager" or "RenderingControl" of the DMR rendering device.

The DMC Digital Media Controller also searches to find out if there are one or more "APPRUNTIME" execution devices in the UPnP network capable of executing the games type content.

According to one embodiment, the "APPRUNTIME" execution device is made in the form of a UPnP service for the execution of software applications implemented within a UPnP device, this service being announced by the UPnP device when implementing the discovery protocol SSDP (Simple Service Discovery Protocol) as stipulated in the UPnP standard. This service can be implemented preferably on PC "Media Center" type powerful apparatuses or games panels (PS3 or XBOX360). Thus, the "APPRUNTIME" execution device is itself a full-fledged UPnP device.

When implementing this discovery protocol, the "APPRUNTIME" execution device sends the DMC control device a list of actions (commands) which can be invoked with the execution device and declares its capacities and resources. Thus, the DMC Digital Media Controller can make an assessment of whether the "APPRUNTIME" execution device is capable of executing the game type content in comparing the capacities and resources declared with the metadata of a software application indexed by the DMS Digital Media Server.

According to the invention, the actions listed by the "APPRUNTIME" execution device are the following:
GetEnvironmentDescription( ): sending the list of compatible execution environments (executable native WINDOWS™, Java, Flash, etc.);
GetSystemResources( ): sending the list of the sources free on the apparatus in terms of memory and CPU (power of the processor).

If the DMC Digital Media Controller detects several "APPRUNTIME" execution devices on the UPnP network (for example a PC and a games console), it chooses the most appropriate device to execute the games type content in evaluating the environments required by the game and the available resources (CPU and memory) on the "APPRUNTIME" execution devices available to execute the game.

Thus, in this embodiment of the invention, the selection of the compatible execution device DMR for the remote execution is done by a DMC Digital Media Controller.

In other words, synthetically, prior to the execution of the software application, the invention performs:
a check by the DMC Digital Media Controller on:
the compatibility of the execution environment required by the software application selected (environment, peripherals);
the presence of one or more "APPRUNTIME" execution devices capable of executing the selected software application.
An operation for obtaining, by means of the "APPRUNTIME" execution device, an execution engine or of an element of an execution engine when the execution engine or the element of said execution engine is absent from the "APPRUNTIME" execution device.

2.5. Rendering of a Game to a DMR Digital Media Renderer by Means of the Preliminarily Selected "APPRUNTIME" Execution Device If the game can be rendered, on the one hand, on the DMR Digital Media Renderer and, on the other hand, on an "APPRUNTIME" execution device capable of executing the game has been detected on the UPnP network by the DMC Digital Media Controller, an initialization is carried out on the mechanisms which, according to the invention, enable the execution of the game selected by the user.

The first mechanism transforms the audio and/or video data resulting from the execution of the game on the "APPRUNTIME" execution device into a stream to be distributed in streaming mode towards the DMR Digital Media Renderer. Such a stream is said to be "streaming". The audio and the video are multiplexed in this "streaming".

A particular software brick that is implemented in the context of the invention enables the conversion of the result of the execution of the video game on the "APPRUNTIME" execution device into a "streaming" multimedia stream which is transmitted to the DMR Digital Media Renderer to be rendered therein. It can furthermore be noted that the stream can be transmitted to several DMR rendering devices of the UPnP network simultaneously. This enables a rendering on different DMR Digital Media Renderer.

In order to enable the actions of the users to be taken into account in the implementing of the software application and in order to inform the rendering device where it must search for the "streaming", the invention also proposes a second mechanism in the form of a two-stage technique:
a creation of an application session within the execution device;
an initialization of the execution of the software application comprising a use of at least two location addresses enabling the exchange of the data between the DMR Digital Media Renderer and the "APPRUNTIME" execution device. In this embodiment of the invention, the addresses in question correspond respectively to the first and second pieces of connection data for connection with the execution device already presented:
the first address makes it possible to know the source of the "streaming"; it is to this address that the stream coming from the execution of the software application is transmitted; this address is transmitted to the rendering device; it is the DMR Digital Media Renderer that will search for the streaming at this address.
the second address is the address to which the commands representing actions performed by the user by means of peripherals of the rendering device are transmitted by the DMR Digital Media Renderer; it is at this address that the control commands of the game (top, bottom, forward, rear, skip, pull, etc.) are obtained in order to take account of the actions performed by the user; this address is also transmitted to the rendering device.

More particularly, the rendering of a game on a DMR Digital Media Renderer from the pre-selected "APPRUNTIME" execution device comprises the following steps described with reference to FIG. 2B.

It is assumed that the user of the control device has selected a software application for which an execution is requested and that the DMC Digital Media Controller has available metadata of this software application as recorded by the DMS Digital Media Server. These pieces of metadata comprise an indication according to which the content concerned is a software application. The DMC Digital Media Controller undertakes a procedure for linking the selected rendering device and the selected execution device, according to the following description:

1) The DMC control device sends the execution device an instruction for initializing the software application in calling up (23-1) an action named for example "PrepareForStreaming" of the selected "APPRUNTIME" execution device, this instruction being accompanied by the "URI_ORIGINAL" address of a resource associated with the software application, in the form of a data file, comprising the software module designed for executing the software application. This instruction is also accompanied by the list of environments supported by the game, this list being extracted from the metadata of the content provided by the DMS contents server.
2) The "APPRUNTIME" execution device verifies (23-2) that it is capable of executing the game in verifying whether an execution engine (i.e. for example a virtual machine) is required; if the equipment on which the "APPRUNTIME" execution device is executed does not include such an execution engine, the "APPRUNTIME" execution engine is downloaded by the "APPRUNTIME" execution device (for example a virtual machine or an adequate software is downloaded).

3) The "APPRUNTIME" execution device reserves resources for executing the game and creates an applications session (23-3) to execute the software application identified by the "URI_ORIGINAL" address. The applications session is identified by an ID_SESSION identifier. When the "APPRUNTIME" execution device is capable of executing several software applications (if its computation power and its memory allow it), an applications session is created by the execution device for each software application to be executed. This ID_SESSION identifier makes it possible, in this case, to manage the different application sessions created and the communications links between the execution device and the rendering device or devices targeted for each software application concerned. The "APPRUNTIME" execution device obtains a software module designed to execute the software application targeted by downloading the content stored at the URI_ORIGINAL address received.

4) The "APPRUNTIME" execution device responds (23-4) to the PrepareForStreaming( ) action by a return code (OK or error code) and by sending the first and second connection data: firstly, a URL type streaming address denoted as URL_STREAMING and, secondly, a URL type address denoted as URL_USER_INPUT which serves to transmit the commands to be executed by the software application. These two addresses contain the session identifier ID_SESSION identifying the application session during which the "APPRUNTIME" execution device must initialize the software application considered.
   a. example of URL_STREAMING: http://<IP address APPRUNTIME<:<Port APPRUNTIIVIE>/stream?sessionID=ID_SESSION
   b. example of URL_USER_INPUT: http://<IP address APPRUNTIME>:<Port APPRUNTIME>/userInput?sessionID=ID_SESSION?inputType=keyboard&keycode=a or . . . ? sessionID=ID_SESSION ?inputType=mouse_button_pressed&button=LEFT ou . . . /sessionID=ID_SESSION?inputType=mouse_pos&x=340&y=448

5) Following the reception of a response from the execution device, the DMC control device modifies (23-5) the metadata of the game type content selected to add therein a property, encoded for example in the form "specific:url_user_input" which specifies the URL_USER_INPUT address to be used to transmit the commands to be executed by the software applications.

6) The DMC control device transmits parameters for rendering a multimedia content to the DMR rendering device when the multimedia content in view is a multimedia stream resulting from the execution of a software application, these parameters comprise the first and second sets of connection data: the DMC Digital Media Controller transmits these rendering parameters by invoking (23-6) the "SetAVTransportURI" action of the "AVTransport" service of the DMR Digital Media Renderer: this action comprises the following in parameters:
   the address at which the multimedia content to be rendered is liable to be obtained, in this case the address URL_STREAMING obtained by the "APPRUNTIME" execution device;
   indexing data or metadata of the multimedia content to be rendered, in this case the metadata modified as described here above.

7) The DMR Digital Media Renderer analyses (23-7) the modified metadata transmitted as a parameter of the action "SetAVTransportURI"; it extracts especially the URL_USER_INPUT address; these modified metadata comprise, owing to the presence of the "url_user_input" property, an additional indication according to which the content to be rendered is a multimedia stream resulting from the execution of a software application; the rendering device therefore determines that it must transmit, to this software application, during its execution, commands representing actions performed by a user by means of peripherals of the rendering device; the DMR Digital Media Renderer is thus informed of the way in which the multimedia content for which this action "SetAVTransportURI" has been invoked must be rendered.

8) The DMC Digital Media Controller sends a command for rendering the multimedia content for which rendering parameters have been transmitted to the means of the "SetAVTransportURI" action; since the multimedia content targeted by this rendering command is a multimedia stream resulting from the software application executed by the execution device, this rendering command is intended for activating a rendering, by said rendering device, of the multimedia stream resulting from the execution of the software application; the sending of this command is done by invoking (23-8) the Play( ) action of the "AVTransport" service of the DMR Digital Media Renderer.

9) Following the reception of the rendering command, the DMR Digital Media Renderer requests the setting up of a first communications link with the execution device in order to receive, through this first communications link, the multimedia stream resulting from the execution of the application; to this end, the DMR Digital Media Renderer sends (24-1) an HTTP request to the URL_STREAMING address received in the rendering parameters, and therefore gets connected to the "APPRUNTIME" execution device to obtain the multimedia stream and render this multimedia stream.

10) Following the reception of the HTTP request, the "APPRUNTIME" execution device activates the execution (24) of the software application (of the video game) during the applications session created here above and agrees to set up the first communications link.

11) The "APPRUNTIME" execution device obtains the images and/or sounds produced by the game and, from these images and/or sounds, generates a multimedia stream which it transmits (25) to the DMR Digital Media Renderer through the first communications link. The transmission can be based on the digital television transmission protocols such as for example the MPEG2-TS with video and audio multiplexing.

12) The DMR rendering device receives (25-1) the multimedia stream transmitted through this first communications link, extracts the audio and/or video data from this stream and then renders this multimedia stream: the video content is displayed and the sound of the audio content of the stream is rendered; the user can then make use of peripherals (keyboard, mouse, etc.) of the DMR Digital Media Renderer to interact on the execution of the software application as if this execution were being done locally by the DMR Digital Media Renderer.

13) The DMR Digital Media Renderer also asks to set up a second communications link with the execution device in order to transmit, through this second communications link, commands to be executed by the software application; to this end, the DMR Digital Media Renderer sends (24-1), an HTTP request towards the URL_USER_INPUT addresses received in the rendering parameters and thus connects up to the "APPRUNTIME" execution device.

14) Following the reception of this second HTTP request, the "APPRUNTIME" execution device agrees (24) to set up the second communications link, receives the commands transmitted by the DMR rendering device through this second link and transmits these commands to the software application; thus when the user uses the peripherals (keyboard, mouse, etc.) on the DMR rendering device to interact with the software application in execution, the resulting multimedia stream of which is being rendered (with display of video, rendering of the sound of the audio content), the DMR rendering device notifies (25) the "APPRUNTIME" execution device through the second communications link in perceiving commands representing actions performed by the user by means of the peripherals of the DMR Digital Media Renderer; the "APPRUNTIME" execution device in turn informs the software application which "reacts" according to the actions represented by the commands received: this implies modifications in the running on the software application (on the game in progress) and therefore in the images and/or sounds produced by this software application thereby leading to a modification of the multimedia stream transmitted through the first communications link.

Thus, the software application (the game) is executed in the environment of the "APPRUNTIME" execution device but the rendering of the multimedia stream resulting from the game is done by the DMR Digital Media Renderer.

The invention thus enables an execution of a software application on a device (the execution device) that is remote relatively to the "rendering" device used by the user to interact with this software application.

The UPnP devices are used to implement this remote execution by complying with the mechanisms proper to the UPnP standard: indexing by the content server, obtaining of metadata by the control device, sending of rendering parameters and a rendering command to the rendering device, sending of an HTTP request by the rendering device to obtain the content to be rendered.

The scenario of execution of a software application indexed as content has been described here above in the case of use of a UPnP three-box (DMC, DMR, DMS) model. It can be transposed without difficulty to the UPnP two-box (DMP, DMS) model in which the functions of the DMC and those of the DMR are integrated into one and the same UPnP device. In this two-box model, the exchanges by invocation of action between the DMC and the DMR described for the three-box model are replaced by simple functional calls within the DMP.

APPENDIX 1

1. Example of Metadata of a Photo According to the UPnP Protocol

```
<item id="2$73688166$805306398" parentID="2$73688166" restricted="1">
<dc:title>Beach</dc:title>
<upnp:album>Vacation</upnp:album>
<dc:date>2009-07-16</dc:date>
<upnp:class>object.item.imageItem.photo</upnp:class>
<res size="19623" resolution="720x479" protocolInfo="http-
get:*:image/jpeg:DLNA.ORG_PN=JPEG_MED;DLNA.ORG_OP=01;DLNA.ORG_FLAGS=
00f00000000000000000000000000000">http://192.168.1.15:8055/DLNA-
720x479/photo/beach.jpg</res>
<res resolution="48x32" protocolInfo="http-
get:*:image/jpeg:DLNA.ORG_PN=JPEG_TN;DLNA.ORG_OP=01;DLNA.ORG_CI=1;DLN
A.ORG_FLAGS=00f00000000000000000000000000000">
http://192.168.1.15:8055/dlna-48x32/photo/plage.jpg</res>
</item>
```

2. Example of Object Representation of a Software Application Corresponding for Example to a Game in Flash Language Used According to the Distribution Method of the Invention, Using Especially a Novel Indexing Class Dedicated to Interactive Software Applications, According to the UPnP Protocol

```
<item id="2$73688166$805306398" parentID="2$73688166" restricted="1">
<dc:title>Imaginarium</dc:title>
<dc:date>2010-03-16</dc:date>
<upnp:class>object.item.gameItem</upnp:class>
<res resolution="720x479" protocolInfo="http-get:*: application/x-shockwave-
flash:DLNA.ORG_PN=FLASH>http://192.168.1.15:8055/DLNA-
720x479/game/imaginarium.swf
</res>
<upnp:genre>adventure</upnp:genre>
<specific:life_span>5</specific:life_span>
<specific:required_peripherals>keyboard,joystick</specific:required_peripherals>
<specific:optional_peripherals>wheel</specific:optional_peripherals>
<specific:difficulty>easy</specific:difficulty>
<specific:game_engine environment="windows"
environnementVersion="XP,Vista,Seven" name="Flash" version="10">
```

```
http://www.adobe.com/win/flash_player.zip
</specific:game_engine>
<specific:game_engine ...>http://...w</specific:game_engine>
</item>
```

The properties in bold are the properties specific to the indexing phase implemented in the method for distributing a software application according to the invention.

Although the present disclosure has been described with reference to one or more examples, workers skilled in the art will recognize that changes may be made in form and detail without departing from the scope of the disclosure and/or the appended claims.

The invention claimed is:

1. A method comprising:
controlling an execution of a software application by a Digital Media Controller (DMC) device designed for driving at least one multimedia contents Digital Media Renderer (DMR), wherein controlling comprises:
a step of the DMC device obtaining, from a contents server, indexing data of said software application as multimedia contents, said indexing data comprising a first content location address to be used by an execution device to obtain a software module designed for execution of said software application, wherein the execution device is configured to activate the execution of said software application;
a step of the DMC device obtaining, from said execution device, first connection data to be used by a rendering device to set up a first communications link through a network with the execution device and to receive, during said execution, through said first communications link, a multimedia stream resulting from said execution;
a step of the DMC device transmitting, to said rendering device, parameters for rendering a multimedia content comprising said first connection data;
a step of the DMC device sending, to said rendering device, a command for rendering said multimedia content, said command being configured to activate rendering by said rendering device of said multimedia stream;
a step of receiving, from said execution device, second connection data to be used by said rendering device to set up a second communications link through a network with the execution device and to transmit, through said second communications link, at least one command to be executed by said software application and representing at least one action performed by a user by a peripheral of the rendering device;
a step or modifying the indexing data of said software application by integrating therein said second connection data; and
a step of transmitting modified indexing data to said rendering device.

2. The method for controlling according to claim 1, wherein the first connection data is in the form of a second content location address.

3. The method for controlling according to claim 2, wherein the method further comprises a step of transmitting, to said execution device, an instruction for initializing said software application comprising the first content location address.

4. The method for controlling according to claim 1, wherein the method further comprises a step of selecting, from a plurality of execution devices, an execution device capable of executing said software application as a function of a configuration needed for executing said software application.

5. The method for controlling according to claim 1, wherein, when the DMC device is implemented in the form of a UPnP device and when the execution device is implemented within a UPnP device in the form of an applications execution service, the control method comprises a step of implementing a protocol of discovery of said UPnP device and said applications execution service.

6. A control device designed for driving at least one device for rendering multimedia contents and comprising:
means for obtaining, from a contents server, indexing data of a software application as multimedia contents comprising a first content location address to be used by an execution device to obtain a software module designed for execution of said software application, wherein the execution device is configured to activate the execution of said software application;
means for obtaining, from the execution device, first connection data to be used by a rendering device to set up a first communications link through a network with the execution device and to receive, during said execution, through said first communications link, a multimedia stream resulting from said execution communication;
means for transmitting, to said rendering device, parameters for rendering a multimedia content comprising said first connection data;
means for sending, to said rendering device, a command for rendering said multimedia content, which is configured to activate rendering, by said rendering device, said multimedia stream;
means for receiving, from said execution device, second connection data to be used by said rendering device to set up a second communications link through a network with the execution device and to transmit, through said second communications link, at least one command to be executed by said software application and representing at least one action performed by a user by a peripheral of the rendering device;
means for modifying the indexing data of said software application by integrating therein said second connection data; and
means for transmitting modified indexing data to said rendering device.

7. A method for executing a software application, which comprises, within an execution device:
a step of obtaining a software module designed for execution of said software application by using a first content location address;
a step of the execution device activating the execution of said software application;
a step of the execution device transmitting, to a control device designed for driving at least one multimedia contents rendering device, first connection data to be used by a rendering device to set up a first communications link through a network with the execution device and to receive, during said execution, a multimedia stream to be rendered, resulting from said execution;

a step of setting up said first communications link with said rendering device;

a step of transmitting said multimedia stream to said rendering device via said first communications link;

a step of transmitting second connection data to the control device, enabling the control device to modify the indexing data of the software application by integrating therein the second connection data and to transmit the modified indexing data to slid rendering device;

a step of setting up a second communications link with said rendering device via the second connection data received by said rendering device;

a step of receiving at least one command from said rendering device via said second communications link to be executed by said software application and representing at least one action performed by a user by a peripheral of the rendering device.

8. The method for executing a software application according to claim 7, wherein said method comprises:

a step of transmitting, to said control device, second connection data that can be used to set up a second communications link through a network with the execution device, a step of setting up said second communications link with said rendering device, a step of receiving, through said second link, at least one command to be executed by said software application and representing at least one action performed by a user by means of a peripheral of the rendering device, and a step of transmitting said command to said software application being executed.

9. The method for executing a software application according to claim 7, wherein, when the control device is implemented in the form of a UPnP device and when the execution device is implemented within a UPnP device in the form of an applications execution service, the execution method further comprises a step of implementing a protocol of discovery of said UPnP device and said applications execution service.

10. The method for executing a software application according to claim 7, wherein the method further comprises, prior to said activating step, a step of creating an applications session during which said activation step shall be executed, said first connection data comprising an identifier of said applications session and an address of said execution device.

11. A device for executing a software application, wherein the device comprises:

means for obtaining a software module designed for execution of said software application by using a first content location address;

means for activating the execution of said software application;

means for transmitting, to a control device designed for driving at least one multimedia content rendering device, first connection data to be used by a rendering device to set up a first communications link through a network with the execution device and to receive, during said execution, a multimedia stream to be rendered, resulting from said execution;

means for setting up said first communications link with said rendering device;

means for transmitting said multimedia stream to said rendering device via said communications link;

means for transmitting second connection data to the control device, enabling the control device to modify die indexing data of the software application by integrating therein the second connection data and to transmit the modified indexing data to said rendering device;

means for setting up a second communications link with said rendering device via the second connection data received by said rendering device;

means for receiving at least one command from said rendering device via said second communications link to be executed by said software application and representing at least one action performed by a user by a peripheral of the rendering device.

* * * * *